US010865729B2

(12) United States Patent
Achleitner et al.

(10) Patent No.: US 10,865,729 B2
(45) Date of Patent: Dec. 15, 2020

(54) METHOD AND DEVICE FOR OPERATING AN INTERNAL COMBUSTION ENGINE COMPRISING A HIGH-PRESSURE FUEL INJECTION SYSTEM

(71) Applicant: Continental Automotive GmbH, Hannover (DE)

(72) Inventors: Erwin Achleitner, Obertraubling (DE); Christoph Klesse, Woerth A.D. Donau (DE); Tobias Ritsch, Regensburg (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 82 days.

(21) Appl. No.: 15/935,878

(22) Filed: Mar. 26, 2018

(65) Prior Publication Data
US 2018/0209372 A1 Jul. 26, 2018

Related U.S. Application Data

(63) Continuation of application No. PCT/EP2016/074149, filed on Oct. 10, 2016.

(30) Foreign Application Priority Data

Oct. 15, 2015 (DE) .................. 10 2015 220 098

(51) Int. Cl.
*F02D 41/38* (2006.01)
*F02D 41/04* (2006.01)
(Continued)

(52) U.S. Cl.
CPC ....... *F02D 41/3863* (2013.01); *F02D 41/042* (2013.01); *F02D 41/062* (2013.01);
(Continued)

(58) Field of Classification Search
CPC .............. F02D 41/3863; F02D 41/065; F02D 2200/0602; F02M 63/026; F02N 11/0814
See application file for complete search history.

(56) References Cited

U.S. PATENT DOCUMENTS 7,043,375 B2 * 5/2006 Streib ................ F02M 25/0809
702/51
2012/0037122 A1 * 2/2012 Veit ....................... F02D 41/042
123/457
(Continued)

FOREIGN PATENT DOCUMENTS

CN 1594847 A 3/2005
CN 101939523 A 1/2011
(Continued)

OTHER PUBLICATIONS

International Search Report and Written Opinion dated Jan. 18, 2017 from corresponding International Patent Application No. PCT/EP2016/074149.
(Continued)

*Primary Examiner* — Syed O Hasan

(57) ABSTRACT

A method for operating an internal combustion engine having a high-pressure fuel injection system stops and starts the engine independently of an intervention by the motor vehicle operator and then restarted. A high-pressure fuel pump is used to pump fuel to a high-pressure reservoir to which at least one high-pressure fuel injector is connected in order to inject fuel into the at least one cylinder of the internal combustion engine. Fuel pressure can be adjusted on the high-pressure side using an electrically actuated pressure reduction valve (PDV).

10 Claims, 2 Drawing Sheets

(51) Int. Cl.
  *F02D 41/06*   (2006.01)
  *F02N 11/08*   (2006.01)
  *F02M 63/02*   (2006.01)

(52) U.S. Cl.
  CPC ....... *F02D 41/065* (2013.01); *F02D 41/3872* (2013.01); *F02M 63/026* (2013.01); *F02N 11/0814* (2013.01); *F02D 2200/0602* (2013.01); *F02D 2250/31* (2013.01); *Y02T 10/48* (2013.01)

(56) References Cited

U.S. PATENT DOCUMENTS

| | | | |
|---|---|---|---|
| 2014/0278023 A1 | 9/2014 | Roessle et al. | |
| 2015/0167607 A1 | 6/2015 | Park | |

FOREIGN PATENT DOCUMENTS

| | | | | |
|---|---|---|---|---|
| CN | 102108908 A | 6/2011 | | |
| CN | 102667120 A | 9/2012 | | |
| CN | 104110313 A | 10/2014 | | |
| CN | 104712482 A | 6/2015 | | |
| DE | 10038539 A1 | 2/2002 | | |
| DE | 10343758 | * | 4/2005 | ............ F02D 17/00 |
| DE | 10343758 A1 | 4/2005 | | |
| DE | 102005001577 A1 | 7/2006 | | |
| DE | 102008007668 A1 | 8/2009 | | |
| DE | 102011109305 A1 | 2/2012 | | |
| DE | 102012201162 | * | 8/2013 | ............ F02D 41/38 |
| DE | 102012201162 A1 | 8/2013 | | |
| DE | 102013200554 A1 | 7/2014 | | |
| DE | 102013204230 A1 | 9/2014 | | |
| DE | 102014110452 A1 | 6/2015 | | |
| EP | 2492480 A1 | 8/2012 | | |
| FR | 2938606 A3 | 5/2010 | | |
| JP | 2004324440 A | 11/2004 | | |
| JP | 2005098299 A | 4/2005 | | |
| JP | 2009144618 A | 7/2009 | | |
| KR | 101519258 B1 | 5/2015 | | |

OTHER PUBLICATIONS

Office Action dated May 31, 2016 from corresponding German Patent Application No. 10 2015 220 098.1.

Korean Office Action dated Jun. 3, 2019 for corresponding Korean Patent Application No. 10-2018-7013533.

Chinese First Office Action dated Jul. 7, 2020 for the counterpart Chinese Patent Application 201680060153.2.

* cited by examiner

METHOD AND DEVICE FOR OPERATING AN INTERNAL COMBUSTION ENGINE COMPRISING A HIGH-PRESSURE FUEL INJECTION SYSTEM

CROSS-REFERENCE TO RELATED APPLICATIONS

This application claims priority to PCT Application PCT/EP2016/074149, filed Oct. 10, 2016, which claims priority to German Application DE 10 2015 220 098.1, filed Oct. 15, 2015.

FIELD OF THE INVENTION

The invention relates to a method and to a device for operating an internal combustion engine comprising a high-pressure fuel injection system.

BACKGROUND

Modern internal combustion engines for driving motor vehicles are fitted with high-pressure fuel injection systems, by means of which the fuel is injected directly into the combustion chambers at a system pressure>100 bar to 250 bar. In this context, there is the problem that, when the internal combustion engine is switched off, the pressure dissipates slowly (over several hours) by way of extremely small leakage ("tip leakage") at the injection valve into the combustion chambers owing to the existing system pressure in the fuel rail to which the injection valves are connected. When the internal combustion engine is started again after a relatively long deactivation phase, e.g. after 6 hours to 36 hours, this leads to increased exhaust emissions owing to the additional fuel present in the combustion chambers.

This problem will be exacerbated if the maximum value for the system pressure is increased further to a significant extent in future high-pressure fuel injection systems. To satisfy the increased requirements for compliance with exhaust emissions limits and the permitted particle count in future legislation (e.g. EU6c), system pressure requirements in the range of from 350 to 500 bar are conceivable. At the same time, it can be expected that the pressure setpoint will exhibit significantly higher variability (comparable to that in diesel applications) over the working range of the internal combustion engine in the case of a very high maximum value for the system pressure. This is necessary because, on the one hand, the currently applicable NEDC (New European Driving Cycle) and future test cycles that are under discussion, such as RDC (Real Driving Cycle) or WLTC (Worldwide harmonized Light Vehicles Test Cycle), will be applied. The Real Driving Cycle (RDC) includes operating points of the internal combustion engine at full load as well, where high system pressures are required to reduce the particle count. In the New European Driving Cycle (NEDC), in contrast, the current system pressures will continue to be applied. Stop/start functionality will also continue to increase in importance, and this is likewise part of the exhaust gas test cycle. With such an automatic start/stop function, the internal combustion engine can be automatically switched off independently of an intervention by a motor vehicle operator, and, without operating the ignition key or the start button, can also be automatically restarted, e.g. by touching the accelerator or clutch pedal. In this context, the internal combustion engine is switched off particularly in prolonged idling phases, in which the driving power of the internal combustion engine is not needed. In this way, it is possible to achieve considerable fuel savings, particularly in inner-city traffic involving a large number of traffic light stops.

Particularly restarting when using the stop/start functionality will take place at a significantly higher system pressure in future in order likewise to reduce the particle count. Owing to the strict time requirements for restarting, the required system pressure will not be accomplished by building up the pressure with the high-pressure pump but will be accomplished by the system pressure in the rail, which is present in the high-pressure system whenever the internal combustion engine is stopped.

However, this solution is critical in respect of tip leakage since it is not possible to distinguish whether this is now a restart after a stop/start or a new start after a prolonged deactivation time of the internal combustion engine and there is a corresponding decrease in the available rail pressure due to a very small leakage at the injection valves into the combustion chamber.

Tip leakage can be avoided if the pressure in the rail is reduced to ambient pressure when the internal combustion engine is stopped. However, this is not possible since current systems do not have an active capability for pressure reduction. That is to say that an effort will be made to apply the pressure in such a way when the internal combustion engine is stopped that, on the one hand, there is still the possibility of ensuring the restart by the stop/start functionality and, on the other hand, that the pressure in the system does not lead to high tip leakage when the vehicle is parked. However, this is all just a compromise: it is not possible to avoid tip leakage. This situation is exacerbated if, as described above, the maximum values for the system pressures and also the injection release pressures increase further. Injection release pressure should be taken to mean the pressure required for the first injection process.

If the system pressure rises significantly for future fuel injection systems, as described above, a variable pressure setpoint will also be necessary for this eventuality. A variable pressure setpoint can only be provided if there is the possibility of active pressure reduction on the high-pressure side of the system since the fuel injection system on the high-pressure side is leaktight, apart from the very small leakage.

SUMMARY

It is the underlying object of the invention to specify an improved method and an improved device which allow selective pressure reduction in the fuel supply system of an internal combustion engine.

This object is achieved by the features of the independent patent claims. Advantageous embodiments are specified in the dependent claims.

The invention is distinguished by a method and a corresponding device for operating an internal combustion engine comprising a high-pressure fuel injection system for an internal combustion engine of a motor vehicle, said system having an automatic stop/start function, by means of which the internal combustion engine can be switched off independently of an intervention by the motor vehicle operator and then restarted, in which a high-pressure fuel pump is used to pump fuel to a high-pressure reservoir, to which at least one high-pressure fuel injector is connected in order to inject fuel into the at least one cylinder of the internal combustion engine, and the fuel pressure can be adjusted on the high-pressure side using an electrically actuated pressure reduction valve. When the internal combustion engine is stopped, the pressure reduction valve is opened until a specified value of an injection release pressure is established which ensures a restart after a stop phase within a stop/start cycle, and the pressure reduction valve is subsequently closed. A check is carried out to determine whether a restart of the internal combustion engine takes place within a specified time period. The fuel is injected using the value of the release pressure if a restart occurs within the specified time period. Otherwise, the pressure reduction valve is opened after the specified time period expires until the pressure of the fuel in the high-pressure reservoir has decreased to a value of the ambient pressure of the motor vehicle.

By means of the method according to the invention and the device, introduction of fuel in the form of a very small leakage (tip leakage) into the combustion chamber during a prolonged stoppage of the internal combustion engine can be reliably prevented in a simple manner. As a result, increased emissions do not occur when the internal combustion engine is restarted.

According to an advantageous embodiment, the specified time period corresponds to the control unit after-run, during which a controller exercising open-loop and/or closed-loop control over the internal combustion engine is still in operation after the internal combustion engine has been switched off. In other words, the control of the pressure reduction valve on the high-pressure side of the high-pressure fuel injection system is coupled to the control signal for the after-running of the control unit when the internal combustion engine is stopped. The pressure reduction valve is thereby selectively controlled in order to reduce the system pressure from the injection release pressure level to ambient pressure on completion of the control unit after-run.

According to another embodiment, after the expiry of the specified time period and with the controller exercising open-loop and/or closed-loop control of the internal combustion engine deactivated, said device is activated briefly by means of a wake-up signal and the pressure reduction valve is opened by means of signals of the controller. It is thereby likewise possible reliably to prevent unwanted fuel inputs into the combustion chambers of the internal combustion engine due to leakage of the high-pressure fuel injectors.

Further advantages and embodiments of the invention will become apparent from the following description and from the figures of the illustrative embodiments.

BRIEF DESCRIPTION OF THE FIGURES

In the figures.

DETAILED DESCRIPTION

Figure 1:
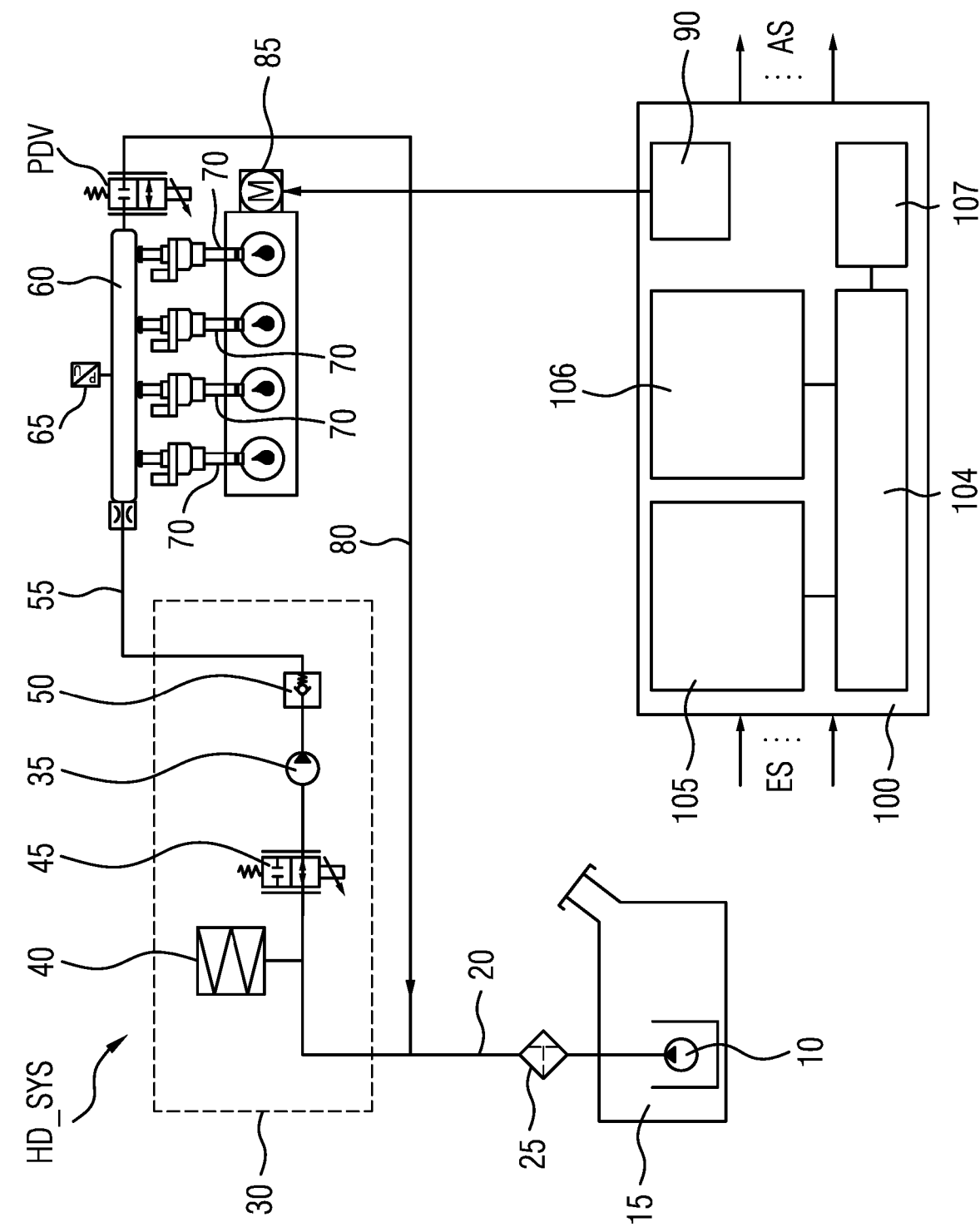
FIG. 1 shows, in a schematic illustration, an internal combustion engine having a high-pressure fuel injection system according to a first illustrative embodiment.

In FIG. 1, the high-pressure fuel injection system HD_SYS of an applied-ignition internal combustion engine for injecting fuel into the combustion chambers of the cylinders of the internal combustion engine is illustrated in a schematic way.

The high-pressure fuel injection system HD_SYS has a fuel pre-supply pump 10 (tank pump), which is preferably an electrically operated pump and which is arranged in a fuel storage tank 15. The outlet of the fuel pre-supply pump 10 is connected by a first low-pressure feed line 20 and a fuel filter 25 arranged therein to a high-pressure fuel pump unit 30. This has a high-pressure fuel pump 35, upstream of which there are a fuel damper 40 and an electrically actuable volume flow control valve 45. In this example, the volume flow control valve 45 is embodied as a digital inlet valve.

The high-pressure fuel pump 35 supplies the high-pressure fuel via an outlet valve 50 and a high-pressure line 55 to a high-pressure reservoir 60 (common rail, fuel rail). The outlet valve 50 can be embodied as a spring-loaded check valve or as an electrically actuable valve (digital outlet valve). To determine the fuel pressure, a pressure sensor 65 is provided on the high-pressure reservoir 60.

High-pressure fuel injectors 70 are connected to the high-pressure reservoir 60 in accordance with the number of cylinders of the internal combustion engine. In the illustrative embodiment shown in FIG. 1, the internal combustion engine has 4 cylinders and hence 4 high-pressure fuel injectors 70. However, the invention can also be used with internal combustion engines with any number of cylinders.

For the selective reduction of the pressure in the high-pressure fuel injection system HD_SYS, whether by advantageous, highly dynamic pressure changes in the course of future exhaust emissions tests, such as the RDC (Real Driving Cycle) or, for safety reasons, after the internal combustion engine has been switched off, an actuator for active pressure reduction in the form of a pressure reduction valve PDV (Pressure Decay Valve) is provided in the high-pressure fuel injection system HD_SYS. In this context, the expression "active" means that the pressure reduction valve PDV can be opened and closed by means of electric signals, in contrast to spring-loaded pressure relief valves, which open automatically when a specified pressure is reached. In this first illustrative embodiment, the pressure reduction valve PDV is arranged on the high-pressure reservoir 60. If the pressure reduction valve PDV is opened, fuel flows back into the first low-pressure feed line 20 at a point downstream of the fuel filter 25 via a return line 80. This active pressure reduction valve is advantageously embodied as a digital ON/OFF valve. However, the active pressure reduction valve can also be embodied as a proportional valve (Pressure Control Valve, PCV).

Moreover, the internal combustion engine is assigned a starting device 85 for electric starting, said device being coupled to the crankshaft of the internal combustion engine. Here, the starting device 85 can comprise a conventional starter or an "integrated starter-generator", for example.

For open-loop and closed-loop control of the internal combustion engine, a controller 100 is provided, which can also be referred to as a device for operating the internal combustion engine or simply as an engine control unit. It is assigned sensors which detect various measurement variables and determine the measured values of the measurement variable. Operating variables comprise not only the measurement variables but also variables derived therefrom. By means of actuation signals, in accordance with at least one of the operating variables, the controller 100 actuates the final control elements which are assigned to the internal combustion engine and to which corresponding actuating drives are assigned.

In the context of the invention, the pressure sensor 65 on the high-pressure reservoir 60 may be mentioned, in particular, as a relevant sensor. Signals from further sensors which are required for the open-loop and/or closed-loop control of the internal combustion engine and/or of the auxiliary units of said engine but are not necessary for understanding the invention are denoted in general by the reference sign ES in FIG. 1.

The final control elements are, for example, the volume flow control valve 45, the pressure reduction valve PDV, the fuel pre-supply pump 10, the high-pressure fuel injectors 70 and the starting device 85. Further signals for final control elements which are required for the operation of the internal combustion engine and/or of the auxiliary units of said engine but are not necessary for understanding the invention are denoted in general by the reference sign AS in FIG. 1.

The controller 100 preferably comprises a processor 104, which is coupled to a program memory 105 and a value memory (data memory) 106. The processor 104, the program memory 105 and the value memory 106 can each comprise one or more microelectronic components. As an alternative, these components can be partially or completely integrated into a single microelectronic component. The program memory 105 and the value memory 106 contain stored programs or values which are required for the operation of the internal combustion engine. Inter alia, a number of map-based control functions are implemented in software, in particular a method for operating the high-pressure fuel injection system HD_SYS and an "automatic stop/start function" 90, by means of which the internal combustion engine is automatically stopped, independently of a driver of the motor vehicle driven by the internal combustion engine, when certain conditions and/or requirements are present, and is started when certain conditions and/or requirements are present. For this purpose, the automatic stop/start function 90 is connected to the starting device 85 by an electrical connection.

Figure 2:
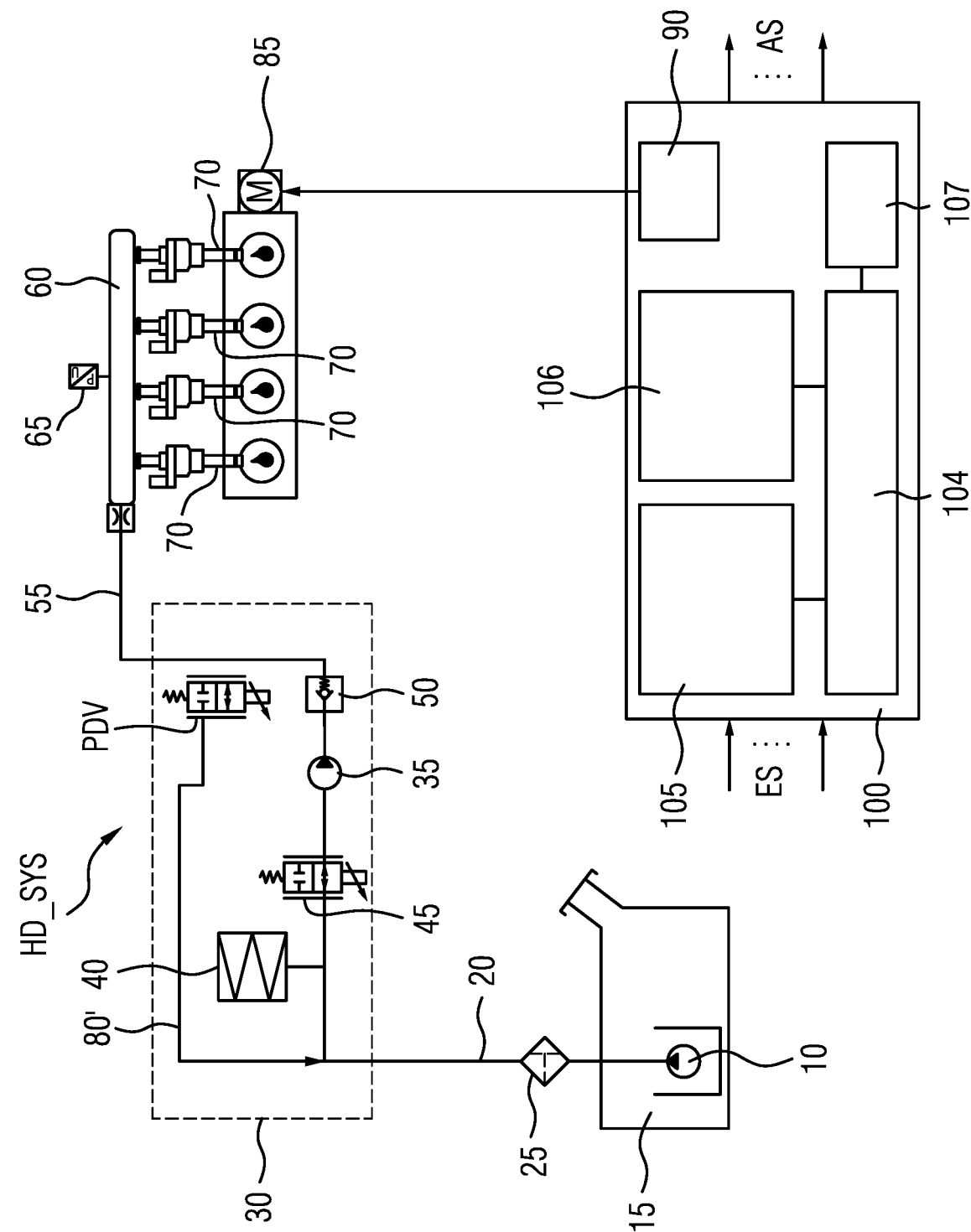
FIG. 2 shows, in a schematic illustration, an internal combustion engine having a high-pressure fuel injection system according to a second illustrative embodiment.
Elements with the same design and/or function are provided with the same reference symbols in all the figures.

Another illustrative embodiment of a high-pressure fuel injection system for an internal combustion engine is illustrated in FIG. 2, this system differing from the illustrative embodiment shown in FIG. 1 only in that the pressure reduction valve PDV is not arranged on the high-pressure reservoir 60 but is integrated into the high-pressure pump unit 30. If the pressure reduction valve PDV is opened, fuel flows back into the low-pressure feed line 20 at a point downstream of the fuel filter 25 via a return line 80'. The other components and the operation thereof in this illustrative embodiment are identical with the components and the operation thereof in the illustrative embodiment described with reference to FIG. 1 and they are therefore not described again.

The way in which the pressure reduction valve PDV can additionally be used in a very effective manner to avoid tip leakage is explained below. Furthermore, however, the pressure reduction valve PDV can also be used to set the optimum and reproducible injection release pressure for restarting after a stop/start phase of the internal combustion engine.

With each stop of the internal combustion engine, the pressure reduction valve PDV on the high-pressure side of the fuel injection system is controlled in such a way that the system pressure is adjusted to the optimum injection release pressure for a subsequent start of the internal combustion engine, the release pressure being required for stop/start operation of the internal combustion engine.

If there is then a restart of the internal combustion engine after a stop/start phase, the restart can take place at the optimum pressure, and thus optimum preconditions for combustion are therefore also available. Such a restart of the internal combustion engine is detected by the controller 10 if the time period within which the internal combustion engine is switched off is no more than 2 minutes. This period of time can be determined, for example, by means of a timer 107 contained in the controller 100.

However, if the driver of the vehicle driven by the internal combustion engine decided to switch the engine off for a longer time period (time period>2 minutes to 6 hours or 36 hours), the system pressure required for starting the internal combustion engine or for the restart, which is about 150 bar to the 200 bar mentioned at the outset, for example, would be present for this time period in the high-pressure reservoir 60 and hence also at the high-pressure fuel injectors 70 and would thus also cause tip leakage with correspondingly higher emissions as a result before a subsequent exhaust gas emissions test.

In this case (stoppage of the internal combustion engine for longer than 2 minutes), the system pressure and the high-pressure fuel injection system must then be reduced to the ambient pressure in an active way, i.e. by means of a selective external intervention, in order to avoid leakage into the combustion chamber. This lowering to ambient pressure can be achieved as follows.

The electric activation of the pressure reduction valve PDV is accomplished by means of the same power supply as for the control unit after-run. In the context of the invention, the term "control unit after-run" should be taken to mean the period of time during which the controller 100 remains in operation after the internal combustion engine has been switched off and is stationary. This time period, usually up to 2 minutes, is required to complete various computing operations after the stopping of the internal combustion engine and to write values to a non-volatile memory, these values being used in the next initialization, i.e. in the next start of the internal combustion engine.

If there is no restart of the internal combustion engine in this time period of the control unit after-run, a control signal is applied to the pressure reduction valve PDV on completion of the control unit after-run in order to open said valve and thus hydraulically depressurize the high-pressure fuel injection system and reduce the pressure in the high-pressure reservoir. The "tip leakage" into the combustion chamber of the internal combustion engine is thus avoided.

In another embodiment, the pressure reduction valve PDV can remain closed even after the completion of the control unit after-run, and the controller can be "woken up" after 10-60 or 120 minutes for a few seconds in the context of a wake-up function, after which the pressure reduction valve PDV can be opened by means of signals from the controller 100 to ensure that the system pressure is reduced and the system is depressurized.

LIST OF REFERENCE SIGNS/LIST OF TERMS

10 Fuel pre-supply pump
15 Fuel storage tank
20 Low-pressure feed line
25 Fuel filter
30 High-pressure fuel pump unit
35 High-pressure fuel pump
40 Fuel damper
45 Volume flow control valve, digital inlet valve
50 Outlet valve
55 High-pressure line
60 High-pressure reservoir (common rail, fuel rail)
65 Pressure sensor
70 High-pressure fuel injector
80, 80' Return line 85 Starting device
90 Automatic stop/start function
100 Controller
104 Processor
105 Program memory
106 Value memory (data memory)
107 Timer
HD_SYS High-pressure fuel injection system
PDV Pressure reduction valve, pressure decay valve
ES Input signals
AS Output signals
PDV Pressure reduction valve

What is claimed is:

1. A method for operating an internal combustion engine comprising a high-pressure fuel injection system for an internal combustion engine of a motor vehicle, said system having an automatic stop/start function, by which the internal combustion engine is switched off independently of an intervention by the motor vehicle operator and then restarted, and in which a high-pressure fuel pump is used to pump fuel to a high-pressure reservoir to which at least one high-pressure fuel injector is connected in order to inject fuel into at least one cylinder of the internal combustion engine, and a fuel pressure is adjusted on a high-pressure side using an electrically actuated pressure reduction valve, the method comprising:
when the internal combustion engine is stopped, opening the pressure reduction valve until a specified value of an injection release pressure is established which ensures a restart after a stop phase within a stop/start cycle, and the pressure reduction valve is subsequently closed,
determining whether a restart of the internal combustion engine takes place within a specified time period,
injecting fuel using the value of the release pressure if a restart occurs within the specified time period,
otherwise, opening the pressure reduction valve after the specified time period expires until the pressure of the fuel in the high-pressure reservoir has decreased to a value of an ambient pressure of the motor vehicle,
wherein the specified time period corresponds to a control unit after-run, during which a controller exercising open-loop control over the internal combustion engine is still in operation after the internal combustion engine has been switched off, and
wherein after expiry of the specified time period and with the controller deactivated from exercising open-loop control of the internal combustion engine, the controller is activated briefly by a wake-up signal and the pressure reduction valve is opened by signals from the controller.

2. The method as claimed in claim 1, wherein the specified time period is between 1 and 3 minutes.

3. The method as claimed in claim 1, wherein the specified time period is between 10 and 120 minutes.

4. The method as claimed in claim 1, wherein the pressure in the high-pressure reservoir is detected by a pressure sensor.

5. A device for operating a high-pressure fuel injection system for an internal combustion engine of a motor vehicle, said system having an automatic stop/start function, by means of which the internal combustion engine is switched off independently of an intervention by the motor vehicle operator and then restarted, in which a high-pressure fuel pump is used to pump fuel to a high-pressure reservoir, to which at least one high-pressure fuel injector is connected in order to inject fuel into at least one cylinder of the internal combustion engine, and the fuel pressure is adjusted on the high-pressure side using an electrically actuated pressure reduction valve, wherein the device is configured to:
when the internal combustion engine is stopped, to open the pressure reduction valve until a specified value of an injection release pressure is established in the high-pressure reservoir which ensures a restart after a stop phase within a stop/start cycle, and subsequently to close the pressure reduction valve,
check whether a restart of the internal combustion engine takes place within a specified time period,
to inject the fuel using the value of the release pressure if a restart occurs within the specified time period, and
if the restart does not occur within the specified time period, to open the pressure reduction valve after the specified time period expires until the pressure of the fuel in the high-pressure reservoir has decreased to a value of the ambient pressure of the motor vehicle,
wherein the device comprises a controller, the specified time period corresponds to an after-run of the controller, during which the controller exercising open-loop control over the internal combustion engine is still in operation after the internal combustion engine has been switched off, and
wherein after expiry of the specified time period and with the controller deactivated, the controller is activated briefly by a wake-up signal and the pressure reduction valve is opened by signals from the controller in response.

6. The device as claimed in claim 5, wherein the pressure reduction valve is arranged on the high-pressure reservoir.

7. The device as claimed in claim 5, wherein the pressure reduction valve is arranged at an outlet of the high-pressure fuel pump.

8. The device as claimed in claim 5, wherein the specified time period is between 1 and 3 minutes.

9. The device as claimed in claim 5, wherein the specified time period is between 10 and 120 minutes.

10. The device as claimed in claim 5, wherein the pressure in the high-pressure reservoir is detected by a pressure sensor of the high-pressure fuel injection system.

* * * * *